United States Patent

Rouchaud

[11] Patent Number: 5,615,458
[45] Date of Patent: Apr. 1, 1997

[54] DEVICE FOR CONNECTING AT LEAST ONE BRAID OF ELECTRIC CABLES TO A CONNECTOR

[76] Inventor: Gilles Rouchaud, Axon'Cable B.P1, 51210 Montmirail, France

[21] Appl. No.: 84,279

[22] PCT Filed: Jan. 3, 1992

[86] PCT No.: PCT/FR92/00004

§ 371 Date: Nov. 2, 1993

§ 102(e) Date: Nov. 2, 1993

[87] PCT Pub. No.: WO92/12552

PCT Pub. Date: Jul. 23, 1992

[30] Foreign Application Priority Data

Jan. 4, 1991 [FR] France .................. 91 00091

[51] Int. Cl.[6] ............................................. B65D 63/08
[52] U.S. Cl. ............................................. 24/23 R
[58] Field of Search ............... 24/20 R, 21, 22, 24/23 R, 23 B, 23 W

[56] References Cited

U.S. PATENT DOCUMENTS

| 3,067,640 | 12/1962 | Lodholm . | |
|---|---|---|---|
| 3,371,390 | 3/1968 | Sieglitz, Jr. | 24/23 B |
| 3,754,303 | 8/1973 | Pollock | 24/23 W |
| 4,646,393 | 3/1987 | Young | 24/23 W X |
| 4,866,817 | 9/1989 | Espevik et al. | 24/23 W |

FOREIGN PATENT DOCUMENTS

| 10024 | 11/1933 | Australia | 24/23 B |
|---|---|---|---|
| 0328305 | 8/1989 | European Pat. Off. . | |
| 502974 | 7/1930 | Germany . | |
| 805763 | 12/1958 | United Kingdom | 24/23 B |
| WO82/02035 | 6/1982 | WIPO . | |

Primary Examiner—James R. Brittain
Attorney, Agent, or Firm—Jacobson, Price, Holman & Stern, PLLC

[57] ABSTRACT

A device for connecting at least one braid of electric cables to a connector.

The device comprises on the one hand a fastening plate provided with a slot, and on the other hand, a metal band of constant thickness and width. One end of the band passes twice through the slot to form two spires around the braid. The other end is subsequently backfolded on one edge of the fastening plate and severed.

5 Claims, 3 Drawing Sheets

DEVICE FOR CONNECTING AT LEAST ONE BRAID OF ELECTRIC CABLES TO A CONNECTOR

The present invention relates to a device for connecting at least one braid of electric cables to a connector.

More specifically, the invention relates to a clamp-type device for insuring the connection between at least a sheathing braid of an electric cable to the rear footing of a substantially cylindrical connector in optimum electric conditions.

The object of the connection of the sheathing braids of an electric cable to the rear fitting of a connector is to ensure sheathing continuity between a sheathed cable and a connector. The sheathing efficiency can be measured with the transfer impedance of the assembly constituted by the sheathing and the connector. The transfer impedance defines within a given frequency range, the contact resistance between the sheathing and the connector for said frequency range. The connection techniques whereby the connection presents an electric continuity over 360° offer the best transfer impedance. The connections by clamps or ties generally ensure a good transfer impedance, the contact being very close between the fitting and the sheathing braid over a large surface. Moreover, these clamping devices are easily mounted and readily adaptable to a wide range of diameters of connectors.

Most of the clamps or tie means currently used are made in one piece and are mounted with pliers controlling the torque. European Patent Application 0 328 305 shows such a clamp.

In order to clarify the problem to be solved, the accompanying FIGS. 1 to 3 show such a type of clamp. The clamp 10 is essentially constituted by a metal band 12 of constant width, of which one end 14 is terminated by a widened and partly bent over portion, said portion being provided with a slot 16. As can be seen in FIGS. 1 and 2 showing a braid 18 to be connected, the band 12 is wrapped twice around the part 18 to be connected, thus passing twice through the slot 16. To ensure the connection, a pulling force is applied on the end 20 of the band 12, and said portion being provided with a slot 16. As can be seen in FIGS. 1 and 2 showing a braid 18 to be connected, the band 12 is wrapped twice around the part 18 to be connected, thus passing twice through the slot 16. To ensure the connection, a pulling force is applied on the end 20 of the band 12, and said end is severed as can be seen in 22.

Such a type of connection clamp presents two major disadvantages. Firstly, the widened part 14 entails a waste of material when the band is cut from the strip serving to produce a plurality of clamps. Moreover, the formation of the clamp necessitates folding operations. It should also be noted that, in the area referenced 24 of the widened portion 14 which surrounds the slot 16, the thickness of the metal is very reduced and what is more, it has been folded. There is a risk of an incipient fracture of the metal band appearing in that area if a strong clamping force is applied with the pliers. Experiments have shown that fracturing occurs around 100 kg of stress.

Document U.S. Pat. No. 3,067,640 describes a system for fastening a clamp. But it is impossible, with this system, to obtain a sufficient clamping continuity in order to produce an electric connection. Moreover, the fastening part is thick.

Document WO-A-82/02035 and document GB-A-805 763 also describe clamping systems constituted by a band and a fastening part. It is however impossible, with said systems, to obtain a sufficient clamping or a sufficiently continuous clamping surface to produce a suitable electric connection.

It is an object of the invention to overcome these disadvantages by providing a connection device of the aforesaid type which is simple and inexpensive to produce while preventing the problems of metal wasting and which also presents sufficient mechanical strength to be able to withstand clamping stresses high enough to ensure a good quality of contact strength between the connector and the sheathing braid.

This object is reached with the device for connecting at least one braid of electric cables to a substantially cylindrical connector to ensure a very low electric contact resistance, according to the invention, comprising on the one hand, a metal band of constant thickness e and width l and, on the other hand, a fastening part in metal, characterized in that said fastening part is of substantially rectangular general shape, and substantially flat and in that it is provided with a slot defining two edges, the length of said slot being slightly greater than the width l of the band, and its width being between 6 and 10 times the thickness e of said band, the first end of said band being engaged in said slot and backfolded on one of said edges of the part on the outer face thereof and said band being engaged twice in said slot and its second end being backfolded over the second edge of said part when said band is wrapped around the cable.

Understandably, the invention makes it possible to avoid all wasting of metal since the metal bands which are produced in a first strip have a constant width and that the metallic fastening parts are cut out in a second strip and that they have likewise a constant width. Moreover, by avoiding the backfolding of the fastening part, said latter has no incipient fracture so that relatively high clamping stresses can be exerted, in order to obtain a very good contact resistance between the connector and the braid of cables.

Other characteristics and advantages of the present invention will become clearer on reading the following description of one embodiment of the invention given by way of example and non-restrictively. The description refers to the accompanying drawings in which:

FIG. 1, already described, shows a clamp according to the prior art, in position around a part to be connected;

FIG. 2, already described, is a similar view to that of FIG. 1, showing a clamp once the tightening operation has been completed;

FIG. 3, already described, shows a partial view in perspective of the clamp of FIGS. 1 and 2;

Figure 1:
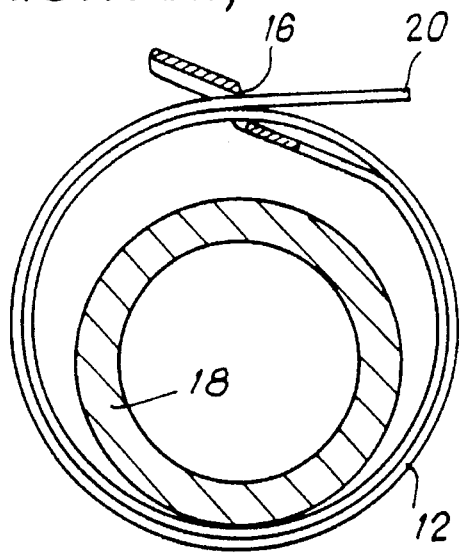
Figure 2:
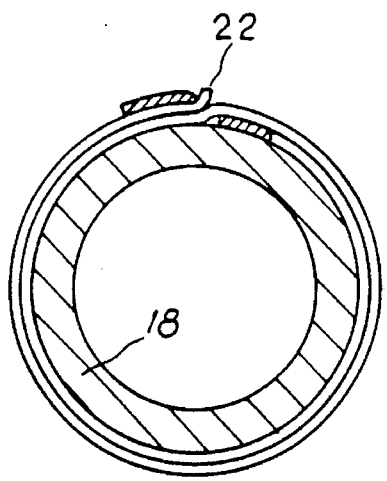
Figure 3:
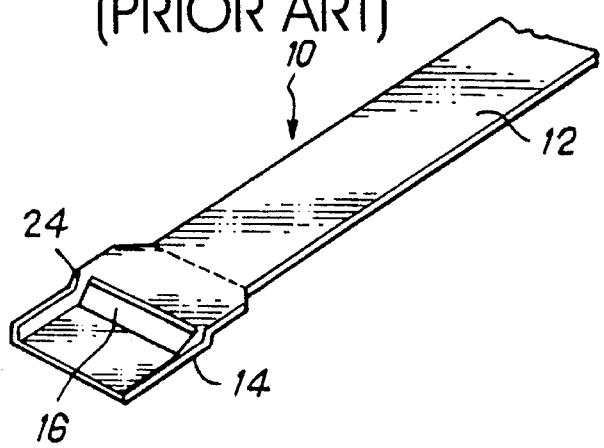
Figure 4:
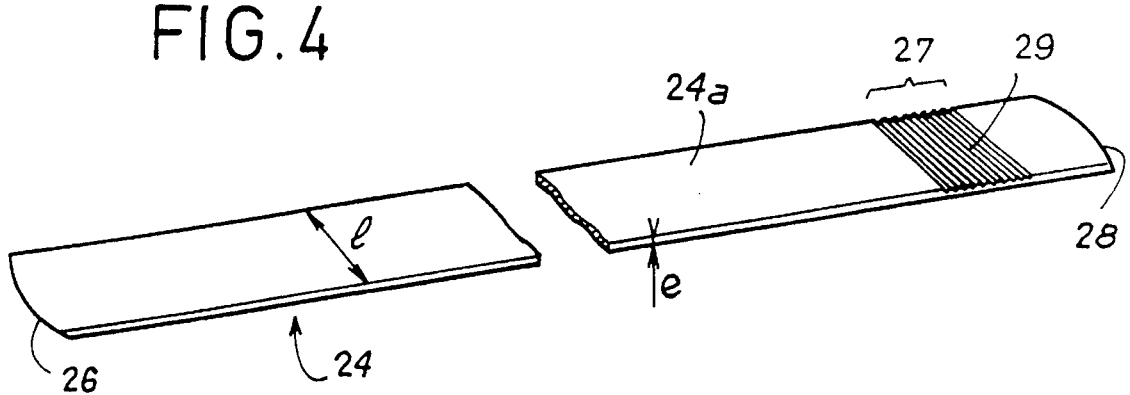
FIG. 4 is a perspective view of the metal band which forms part of the connection device according to the invention.

As already indicated hereinabove, the connection device for connecting at least one braid of electric cable to a substantially cylindrical connector according to the invention, is composed on the one hand of a metal band, more particularly illustrated in FIG. 4, and of a fastening part or yoke, more particularly illustrated in FIGS. 5 and 6.

The clamp 24 is preferably produced in annealed stainless steel. It has a constant length l and a thickness e which is also constant, its two ends, respectively 26 and 28 are slightly rounded. Moreover, the face called internal face 24a of the band preferably comprises proximate to its end 28, a zone 27 provided with striations 29 of small depth disposed perpendicularly to the length of the band. According to a preferred embodiment, the metal band 24 has a length of 370 mm, a thickness e of 0.5 mm and a width l of 6 mm. The striations extend over a length of 10 mm leaving a free length of about 12 mm. According to a variant embodiment, the width l of the band 24 is of 3.5 mm.

Figure 6:
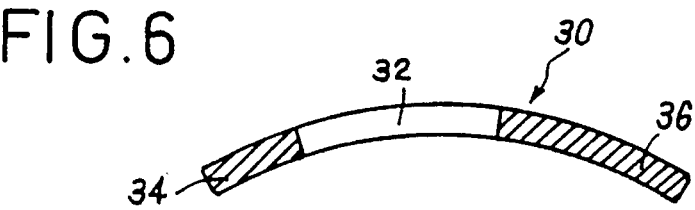
FIG. 6 is a sectional view along line VI—VI.
Figure 5:
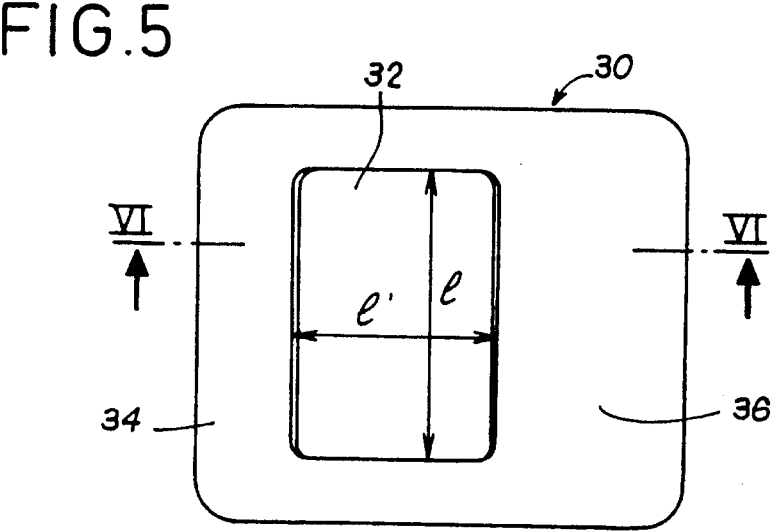
FIG. 5 is a plan view of the fastening part of the connection device.

Referring now to FIGS. 5 and 6, these show that the yoke 30 has the general shape of a rectangle with rounded corners. The yoke 30 is provided with a slot 32 of which the length, in the direction perpendicular to the band 24, is substantially equal to l and of which the width l', in the direction of the length of the band 24, is between 6 and 10 times the thickness e of the band 24. Depending on the direction of the length of the band 24, the slot 32 leaves in the plate 30 two edges 34 and 36, the length of the edge 34 being less than that of the edge 36. As more clearly shown in FIG. 6, the plate forming yoke 30 is preferably slightly arched in order to be more readily adaptable to the bending of the braid and of the connector to be connected together.

According to a preferred embodiment, the yoke 30 is produced in cold-hammered stainless steel and has a length of 10 mm and a width of 9 mm. As to the slot 32, this has a length of 6 mm and a width l' of 4 mm. According to a variant of embodiment, the slot has a length l equal to 3.6 mm. The yoke has a length of 8 mm and a width of 5.5 mm.

It is already clear from the foregoing description that the band 24 and the yoke 30, respectively, can be produced without any wasting of metal, simply by cutting them out from strips of cold-hammered stainless steel and strips of annealed stainless steel, respectively. Indeed, both the band 24 and the yoke 30 have constant widths. Moreover, the production of the yoke 30 no longer requires any additional folding or stamping operation. Only a bending operation may be used for obtaining the shape of the yoke illustrated in FIG. 6. It is also important to note that, considering the absence of folding or stamping operations, the yoke 30 shows no incipient fracture which could cause its destruction during the clamping of the band 24 around the parts to be connected.

Figure 7:
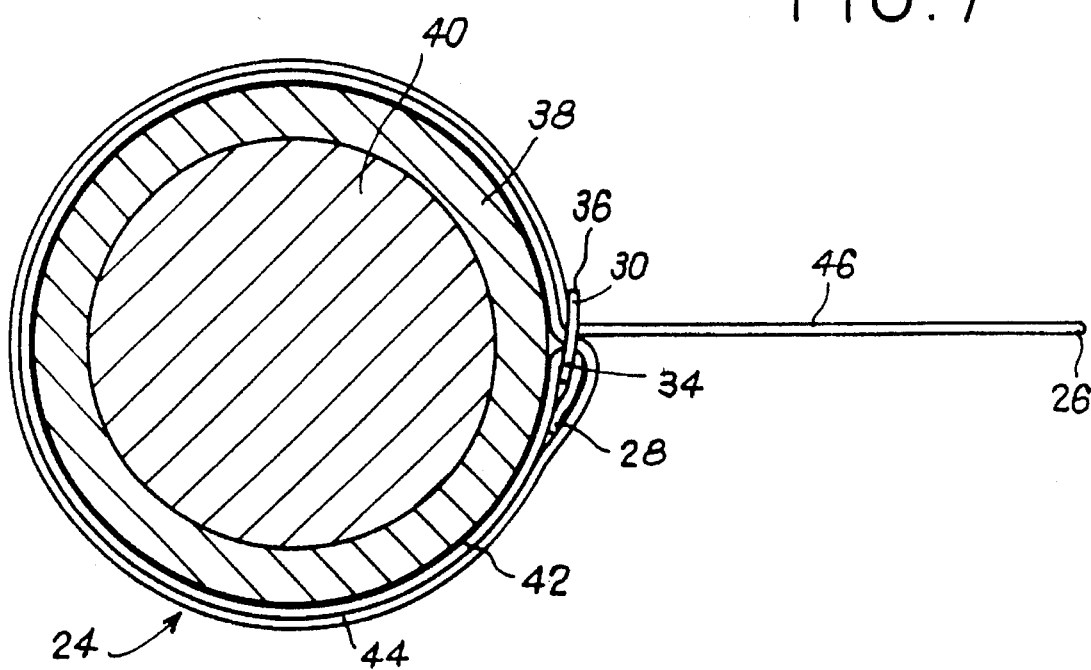
FIG. 7 is a view of the connection device according to the invention shown in clamping phase.
Figure 8:
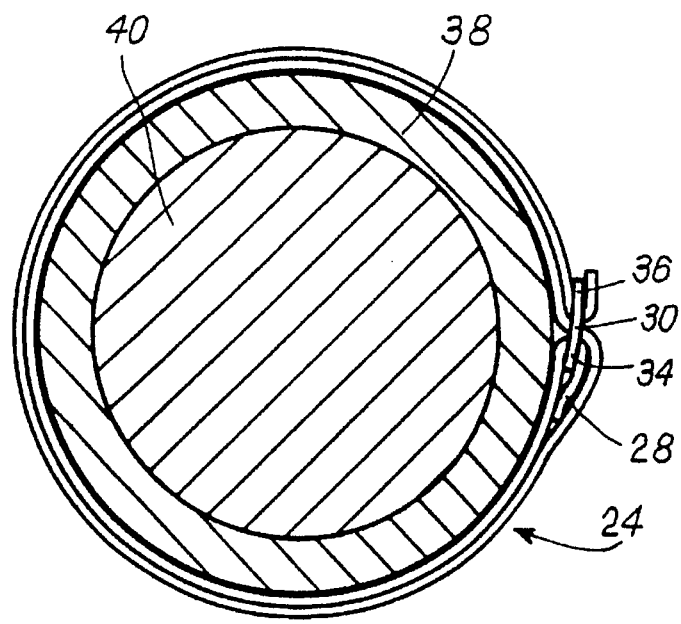
FIG. 8 shows a connection device according to the invention fixed around a part.

FIGS. 7 and 8 show the clamping of a sheathing braid 38 on a rear connector 40 using a clamp according to the invention. As illustrated in FIG. 7, the first end 28 of the band 24 is engaged in the slot 32 and backfolded so as to fasten said end of the band with the yoke 30. More precisely, the end 28 is backfolded on the narrowest edge 34 of the yoke 30. Such backfolding is made easier by the presence of striations 29 in the portion 27 of the band. Moreover, as illustrated in FIGS. 7 and 8, the end 28 is disposed on the external face of the yoke, meaning by this that it is not turned towards the braid 38. A better circumferential clamping continuity is thus obtained. The band 24 forms a first spire 42 around the braid 38, and passes a first time through the slot 32 then it forms a second spire 44 around the braid and passes a second time through the slot 32. The band 24 by passing again over its first end 28 ensures the locking of said end on the yoke 30, even if high stresses are applied thereon. The band 24 has a length sufficient to leave a free end 46 outside the yoke 30, of sufficient length to ensure adequate gripping thereof with the pliers. Once a suitable controlled pulling force has been exerted with that instrument, the end 46 of the band 24 is folded over on the edge 36 of the yoke 30, and then severed as shown in FIG. 8.

It is possible, with the device according to the invention, to exert a pulling force greater than 130 kg on the band 24 in order to ensure suitable clamping of the braid on the connector. Beyond that pulling force, the braids tend to tear up. It is further noted that, due to the shape of the yoke 30 and to the dimensions of the slot 32, the metal band is in contact with the braid over an arc of circle substantially equal to 360°.

The test conducted on braids connected to rear connectors with the clamp according to the invention have shown that the low frequency contact resistance is less than 0.4 mm. The measurement of the transfer impedance of the sheathing braid/connector assembly gives results which are inferior to and therefore of better quality than those obtained with the sheathing recovery techniques used heretofore.

I claim:
1. An assembly including at least one braid of electrical cable, a substantially cylindrical connector and a connecting device comprising a metal band having a first and second end, said band being of a substantially constant thickness and a substantially constant width; and a metal fastening plate of substantially rectangular shape, said plate having an inner surface and an outer surface, said plate being provided with a slot having at least two straight parallel sides respectively defining a first edge and a second edge of said plate, the slot having a length greater than the width of said band and a width that is between 6–10 times the thickness of said band;

wherein the first end of said band is applied against the outer surface of the first edge of said fastening plate, said band further comprising a first portion passing through the slot, a second portion applied around the inner surface of the first edge of said fastening plate, a first loop portion applied against the cable braid, a third portion passing through the slot, a fourth portion applied against the first end of said band, a second loop portion applied against the first loop portion, a fifth portion applied against the inner surface of the second edge of said fastening plate and a sixth portion passing through the slot, the second end of said band being applied against the outer surface of the second edge of said fastening plate.

2. The assembly of claim 1 wherein said band is made from annealed stainless steel and said fastening plate is made from cold-hammered stainless steel.

3. The assembly of claim 1 wherein said band has a thickness of about 0.5 mm.

4. The assembly of claim 1 wherein the first edge of said fastening plate has a width smaller than the second edge of said fastening plate.

5. The assembly of claim 1 wherein said band comprises an inner surface having a portion, proximal to the first end of said band, provided with striations in a direction across the width of the band so as to facilitate fastening of the band.

* * * * *